United States Patent [19]
Bechara et al.

[11] Patent Number: 6,051,620
[45] Date of Patent: Apr. 18, 2000

[54] SCORCH RESISTANT ADDITIVES FOR POLYURETHANE FOAMS

[75] Inventors: Ibrahim Bechara, Naperville; Thomas R. Baranowski, Chicago; James Stogis, Joliet; Thomas H. Morong, Justice, all of Ill.

[73] Assignee: CK Witco Corporation

[21] Appl. No.: 08/873,308

[22] Filed: Jun. 11, 1997

[51] Int. Cl.⁷ .................................................... C08L 75/00
[52] U.S. Cl. .............................. 521/137; 521/50; 528/48; 528/52; 528/59; 528/287; 528/288; 528/369
[58] Field of Search .................................... 528/369, 287, 528/288, 367, 52, 59, 48; 521/50, 137

[56] References Cited

FOREIGN PATENT DOCUMENTS 51-14950   2/1976   Japan .
52-15549   2/1977   Japan .
59-15446   1/1984   Japan .
5215549    2/1997   Japan .

*Primary Examiner*—Duc Truong
*Attorney, Agent, or Firm*—Edward K. Welch, II; Andrew S. Reiskind

[57] ABSTRACT

Polyester polyols which contain at least one dihydrazide linkage —C(═O)—NHNH—C(═O)— reduce the incidence of scorching when used as a reactant in the manufacture of polyurethane foam. Also disclosed are compounds of structures (2) and (3):

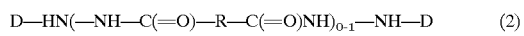

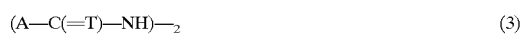

23 Claims, No Drawings

SCORCH RESISTANT ADDITIVES FOR POLYURETHANE FOAMS

FIELD OF THE INVENTION

The present invention relates to processes for production of polyurethane products including foams and fibers (including elastomers) with reduced scorching, to additives useful in such processes, and to products of such processes.

BACKGROUND OF THE INVENTION

Polyurethane foams are made via an exothermic reaction of polyols, water and isocyanates. The temperature of the core of the foam could reach as high as 350° F. As a result a thermo/oxidative degradation of the center of the foam occurs resulting in discoloration ("scorching") of the center of the foam. This scorched part of the foam is an economic loss to the producers since it cannot be used and is often discarded.

To minimize this loss the industry resorts to the addition of anti-oxidants such as butylated hydroxyl toluene (BHT) and tetra bis{methylene(3,5 ditertiary butyl-4-hydroxyl cinnamate}methane. Some use anti-oxidants with trialkyl phosphite but these additives provide for marginal improvement in scorch.

In addition to their marginal effectiveness, some of these additives such as BHT, the most widely used, undergo sublimation and oxidation on exposure to the atmosphere and cause yellowing of the finished composite articles (such as rugs when the foam is used as an underlay). This yellowing is undesirable not only for reasons of appearance but also because it imposes additional costs to treat the rug or other article to remove the yellowing. As a consequence, the elimination of such antioxidants is mandated by many industries.

In Japanese Kokai: 76 14,950 (C.A. 25:7057n) are described elastomers containing hydrazides as anti-oxidants. Japanese 59 15,446 (C.A. 100:211546d) describes the use of hydrazides and semicarbazides as stabilizers for polyurethane filaments. Japanese Kokai: 77 15,549 (C.A. 88:106522d) describes discoloration resistant urethane rubber by the addition of hydrazides. All of the above references deal with elastomeric or fibrous urethanes and not with polyurethane foams. Polyurethane foam technology and composition are significantly different from those of elastomers and fibers. Also, none of the references describe polyesters or polyethers containing hydrazide segments in its structure as a key compound in making oxidation stabilized polyurethane. None of the references disclose or make a reference to the role of catalyst or whipped air in the oxidation of polyurethanes; neither do they mention the role of phosphites as synergists to the hydrazides in stabilizing polyurethanes.

There is thus a need for technology which enables the production of polyurethane foam while reducing the incidence of scorching.

It is also advantageous to be able to make polyurethane elastomers and fibers from precursor materials that are inherently resistant to oxidation and discoloration, thereby eliminating the need for additives that are in many cases fugitive and are depleted over time.

BRIEF SUMMARY OF THE INVENTION

The present invention relates to the discovery that the incorporation of small amounts of hydrazide linkages in the backbone of polyols or the addition of small amounts of certain hydrazide derivatives to the polyol at an effective level such as from 500–6000 ppm drastically reduces scorch or eliminates it in polyurethane foam made from such polyols. This improvement is especially striking when air is accidentally or deliberately whipped into the foaming mixture. The invention is particularly effective in the presence of certain trialkyl phosphites, which appear to act synergistically with the hydrazides. Furthermore, unlike elastomers or fibers, stabilizers for urethane foams must be soluble in the polyol or other component of the foaming formula. since many of the known hydrazides are solids of high melting and poor solubility, one aspect of the invention is modified hydrazide molecules that are of good solubility in the polyols and that at the same time have good anti-scorch activity.

Another aspect of the invention comprises a polyester polyol, in which at least a portion of the ester linkages —C(=O)— are instead hydrazide linkages —C(=O)—NH—NH—C(=O)—. The characteristics of such products are described in greater detail hereinbelow.

Another aspect of the present invention is a process for making polyurethane foam, comprising reacting a polyisocyanate component, a polyol component, and water, wherein at least a portion of the polyol component comprises polyester polyol containing said hydrazide linkages. A further aspect of the present invention is polyurethane foam, made by such a process.

The present invention also comprises novel compounds which are useful as anti-scorch additives in the manufacture of polyurethane foam. Some of these compounds contain hydroxyl groups and are thus useful as at least a portion of the polyol component in the manufacture of polyurethane foam. These compounds have any of the structures (1), (2) or (3):

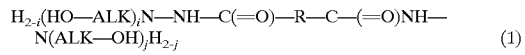
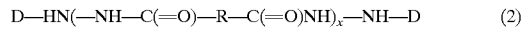

wherein each ALK is independently the same or different and is $C_2H_4$, $C_3H_6$ or $C_4H_8$, R is straight or branched divalent alkyl containing 2 to 36 carbon atoms and preferably 4 to 6 carbon atoms, or cycloalkyl, cycloalkyl-alkyl, or alkyl-cycloalkyl-alkyl, containing 5 to 18 carbon atoms, or aryl, aryl-alkyl, or alkyl-arylalkyl, containing 6 to 18 carbon atoms;

x is 0 to 1;

i is 0 to 2 and j is 0 to 2, wherein the sum of (i+j) is at least 1 and preferably greater than 1, providing a polyol;

D is $R^1$—C(=O)—wherein $R^1$ is $C_1$ to $C_{36}$ alkyl, $C_5$ to $C_{18}$ cycloalkyl, cycloalkyl-alkyl, or alkylcycloalkyl-alkyl, $C_6$–$C_{18}$ aryl, aryl-alkyl, or alkyl-arylalkyl, hydroxy —$C_1$–$C_{12}$ alkyl, or hydroxyethoxyethyl; or (Ph)—R—C(=O)— wherein Ph denotes phenyl which is substituted with hydroxyl and with one or two $C_1$–$C_{18}$ alkyl groups; and when x is 1, D can be any of the foregoing or H; —$CH_3$; or phenyl which is optionally substituted with one, two or three alkyl groups containing 1 to 12 carbon atoms;

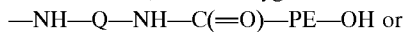
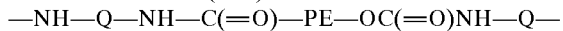
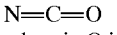

wherein T is oxygen and A is —R—Ph wherein R and Ph are as defined above; or T is oxygen or sulfur and A is —NH—Q—NH—C(=O)—PE—OH or

—NH—Q—NH—C(=O)—PE—OC(=O)NH—Q—N=C=O wherein Q is an aliphatic hydrocarbon group containing from 4 to 12 carbon atoms, a cycloaliphatic hydrocarbon group containing from 6 to 15 carbon atoms, an aromatic hydrocarbon group containing from 6 to 15 carbon atoms, or an araliphatic hydrocarbon group containing from 7 to 15 carbon atoms, provided that Q can contain as well a —C(=O)— group; and PE is an alkoxy or polyalkoxy group or a hydrocarbon containing at least one —C(=O)O— group, wherein preferably PE contains a total of 2 to 60 carbon atoms.

Further aspects of the present invention include processes of making polyurethane foam or fiber using polyols of structure (1), (2) or (3) as at least a portion of the polyol component, or as an anti-scorch additive, depending on the values of i and j; and polyurethane products made by such processes.

DETAILED DESCRIPTION OF THE INVENTION

A. The New Polyols

1. Polyester-derived-polyols

One type of new polyol that has been discovered can be derived from polyester polyols. While these new polyols can be synthesized in several different ways, one convenient way is to react a polyester precursor with hydrazine (for instance as an aqueous solution thereof) under dehydrating conditions of moderately elevated temperature (e.g. on the order of 150°C.) with withdrawal of byproduct water, preferably under a nitrogen purge. The reaction replaces ester linkages with —C(=O)—NHNH—C(=O)— linkages, and generates hydroxy groups (formed by cleavage of the ester linkage). The byproducts are oligomeric polyols which can be left in the reaction product.

These hydrazide polyols are characterized as follows, in Table A:

TABLE A

| | broad | preferred |
|---|---|---|
| molecular weight range | 250–33,000 | 1,000–1,500 |
| Viscosity (cps) at 25 C. | 5,000 to solid | 7,000–25,000 |
| hydroxyl number | 50–300 | 110–160 |
| acid number | 2–5 | 1–2 |

The polyester polyols which can serve as the precursors for forming these hydrazide polyols can be obtained by condensation reaction of diacids and diol plus, as is customary, a portion of triol or polyol to create a branched network and adjust the hydroxyl number.

The dicarboxylic acids that can be used to make the polyester polyol include aliphatic dicarboxylic acids, alicyclic dicarboxylic acids, aromatic dicarboxylic acids, ethylenically unsaturated alkenyl dicarboxylic acids, or mixtures of two or more of any of these acids. Also useful are hydroxy acids and dimer acids. Preferred are alkyl dicarboxylic diacids which generally will contain 4 to 36 carbon atoms, and aromatic dicarboxylic diacids which generally contain 9 to 20 carbon atoms. Examples of useful dicarboxylic acids include oxalic, malonic, dimethylmalonic, succinic, glutaric, adipic, trimethyladipic, pivelic, 2,2-dimethylglutaric, azelaic, sebacic, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,5-norbornanedicarboxylic, 1,4-naphthalic, diphenic, 4,4'-oxydibenzoic, diglycolic, thiodipropionic, 4,4'-sulfonyldibenzoic, oxydiacetic acid, and 2,5-naphthalenedicarboxylic acids. Anhydrides of any of the foregoing are also contemplated.

Preferred difunctional dicarboxylic acids include isophthalic acid, terephthalic acid, phthalic acid, adipic acid, tetrachlorophthalic acid, pivalic acid, dodecanedioic acid, sebacic acid, azelaic acid, 1,4-cyclohexanedicarboxylic acid, 1,3-cyclohexanedicarboxylic acid, maleic acid, fumaric acid, succinic acid, 2,6-naphthalenedicarboxylic acid, glutaric acid, and any of the anhydrides thereof.

Diol compounds that can be used making the polyester polyol include glycols, of which ethylene glycol is the preferred diol.

In cases where glycols in addition to, or instead of, ethylene glycol are utilized, it is preferable for them to contain from 3 to 10 carbon atoms. In cases where glycol ethers are utilized in conjunction with ethylene glycol in the diol component, it is preferable for them to contain from 4 to 10 carbon atoms. Some representative examples of glycols that can be used in conjunction with or instead of ethylene glycol include diethylene glycols 1,3-propylene glycol, 1,2-propylene glycol, 2,2-diethyl-1,3-propanediol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, 2,4-dimethyl-2-ethylhexane-1,3-diol, 1,2-cyclohexanediol, 1,3-cyclohexanedimethanol, 1,4p-xylenediol, and 2,2,4,4-tetramethyl-1,3-cyclobutanediol. Polyols are also contemplated. Preferred polyols contain 3 or more hydroxyl groups and generally up to 8 carbon atoms. Examples include trimethylol propane, hexane-1,2,6-triol, butane-1,2,4-triol, trimethylolethane, pertaerythritol, quinitol, mannitol and sorbitol.

Also useful are polyether glycols such as polytetramethylene glycols, as well as polyethylene glycol (PEG), polypropylene glycol (PPG), and copolymers containing ethylene glycol and propylene glycol units.

If branching is desirable, then it will be advantageous to use a branching agent in the condensation polymerization reaction. Such branching agents may contain three or more functional groups, and they preferably contain three or four functional groups. The reactive groups may be carboxyl or aliphatic hydroxyl. The branching agent may contain both types of groups. Examples of acidic branching agents include trimesic acid, trimellitic acid, pyromellitic acid, butanetetracarboxylic acid, naphthalene tricarboxylic acids and cyclohexane-1,3,5- tricarboxylic acid. Examples of hydroxy acid branching agents are 2,2-dihydroxymethyl propionic acid, 10,11-dihydroxy-undecanoic acid, and 5-(2-hydroxyethoxy)isophthalic acid. Generally from 0 to 3 percent of a polyol containing from 3 to 12 carbon atoms will be used as the branching agent (based upon the total diol component).

The reaction mixture of diacid and diol/polyol is then subjected to condensation polymerization conditions effective to cause the reactants to react with each other to form the desired polyester. In general, effective condensation polymerization conditions are readily familiar to (and ascertainable by) the practitioner. It is preferred not to carry out the reaction in a solvent. However, if a solvent is desired, it should be high boiling (i.e. a boiling point above about 140° C.) Examples of suitable solvents include DMF (dimethylformamide), DMA (N,N-dimethylacetamide), xylene and DMSO.

Preferably, the reactant mixture for carrying out the condensation polymerization includes a small but effective amount such as up to about 0.02 wt. % of a catalyst for the polymerization. Useful catalytic compounds include protonic acids, tin compounds, titanium compounds and antimony compounds.

Typical condensation polymerization conditions are provided by exposing the reactants to temperatures on the order of about 150° C. to about 250° C. During the progress of the reaction, it is preferred to draw off water of condensation. To effectively carry out the desired condensation polymerization it is preferred to use nitrogen to purge the reaction mixture in order to carry out the water.

The chain lengths and molecular weights of the polymers that are useful and produced in the process of the present invention can fall within a rather wide range; typically, polyesters most useful in preparing polyurethanes as described herein will have a molecular weight in the range of about 500 to about 6,000. Thus, amounts and identities of the reactants can readily be tailored to achieve any desired molecular weight and molecular weight distribution.

The resulting polyester polyol can then be reacted with hydrazine to form the hydrazine-bearing polyol of the present invention.

The mole ratio of reactant hydrazine to polyester polyol should be in the broad range of 0.02:1 to 2.2:1 and preferably in the range of 0.35:1 to 1.8:1. In general, 15 to 96% of the ester linkages would be replaced with hydrazide linkages. 2. Carbazide and semicarbazide polyols Other new polyols of this invention have the aforementioned structures (1), (2) or (3):

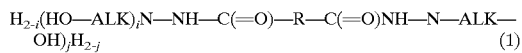  (1)

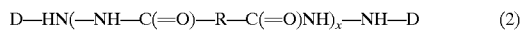  (2)

  (3)

In structure (1) the sum of (i+j) is at least 1, preferably greater than 1 and more preferably at least 2, useful as a polyol in the formation of polyurethane foam. Regardless of the values of i and j, the product is useful in reducing scorch when added to the foam-forming reactants. As indicated by the different definitions of the subscripts i and j, the molecule can be substituted at one or both ends with hydroxyalkyl. While each —ALK—OH group can be the same or different, for ease of synthesis all ALK groups are preferably the same. Preferably, if the structure contains hydroxyls the structure contains at least 2 hydroxyl groups so that it does not cap the reactants in the foaming reaction.

The central R group in structures (1) and (2) can be derived from any diacid. Any of the diacids mentioned herein can be used.

The polyols of structures (1) and (2) can be synthesized by first reacting the corresponding diacid HOOC—R—COOH with hydrazine at a hydrazine: diacid mole ratio of at least 2:1 to form the intermediate dihydrazide $H_2N$—NHC(=O)—R—C(=O)NH—$NH_2$. Alternatively, the intermediate dihydrazide can be obtained commercially if available. Then, to make products of structure (1), the intermediate dihydrazide is reacted with ethylene oxide, propylene oxide, or butylene oxide, or a mixture thereof, as the case may be depending on the structures of the hydroxyalkyl-substitution that is desired. The number of moles of alkylene oxide is selected as a function of the degree of substitution desired on the terminal nitrogens of the intermediate dihydrazide.

To make products of structure (2), varying equivalents of hydrazines are reacted with mono or dibasic acid or their esters with subsequent removal of the by-product water or alcohol. Other products of structure (2) can be made by reacting the dihydrazides with $R^1C(O)$—L or (Ph)—R—C(O)—L where R, $R^1$ and Ph are as defined previously and L is a leaving group such as OH or an alkoxy radical.

The preferred Ph group is 4-hydroxy-3,5-dialkyl phenyl.

Compounds of structure (3) can be made by reacting hydrazine with excess equivalents of diisocyanate followed by capping of the unreacted —NCO groups with glycol, polyols of varying type and molecular weight, diamines of varying chain length, fatty alcohols and the like. Alternatively other compounds of structure (3) can be made by reacting a polyol, hydrazine and a stoichiometric excess of diisocyanate to form oligomers that are terminated with —NCO groups.

B. Uses of the New Polyols

Both the polyester-derived polyols and the diacid-derived polyols are useful in the reaction of polyisocyanate, polyol and water to form polyurethane foams and fibers.

Any organic polyisocyanates may be used in the process according to the invention. It is preferred to use polyisocyanates of the formula $Q(NCO)_2$ wherein Q represents an aliphatic hydrocarbon group containing from 4 to 12 carbon atoms, a cycloaliphatic hydrocarbon group containing from 6 to 15 carbon atoms, an aromatic hydrocarbon group containing from 6 to 15 carbon atoms or an araliphatic hydrocarbon group containing from 7 to 15 carbon atoms, provided the Q can contain a —C(=O) group as well. The most preferred diisocyanate is isophorone diisocyanate. The following are examples of other preferred diisocyanates: tetramethylene-diisocyanate, hexamethylene diisocyanate, dodecamethylene-diisocyanate, 1,4-diisocyanato-cyclohexane, 1-isocyanato-3,3,5-trimethyl-5-isocyanatomethyl cyclohexane, 4,4'-diisocyanatodicyclohexylemethane, 4,4'-diisocyanato-dicyclohexyl-propane-(2,2); 1,4-diisocyanato-benzene, 2,4-diiocyanatotoluene, 2,6-diisocyanatotoluene, 4,4'-diisocyanatodiphenylmethane, 4,4'-diisocyanatodiphenyl-propane-(2,2), p-xylylene-diisocyanate, a,a,a',a'-tetramethyl-m- or p-xylylene-diisocyanate and mixtures of these compounds. Mixtures of any of the foregoing can also be used.

The polyol component can be comprised entirely of polyester-derived polyols or diacid-derived polyols of the present invention, which contain a dihydrazide linkage, or it can also contain one or more polyester polyols prepared as described hereinabove which do not contain a dihydrazide linkage.

To make foam, the polyisocyanate and polyol components are combined with water, in conventional manner, preferably at a mole ratio of polyisocyanate: polyol of about (1.9–2.1):1. Preferably, a catalyst for the reaction can be added as well. Suitable catalysts and the amounts to use are well known to those skilled in this field.

Other additives such as fire retardants, fillers and colorants, can also be added, in amounts effective to achieve the desired function of each additive.

The hydrazide compounds of the present invention which are not hydroxyl-substituted should be added to the foamable formulation in an amount of about 500 to about 6,000 ppm based on the weight of the polyol.

The hydrazide compounds of the present invention appear to be particularly effective when present together with tri($C_1$–$C_4$) alkyl phosphite, which (when used) should be added in an amount of 500 to 10,000 ppm, based on the weight of the polyol. Preferred trialkyl phosphites include triphenyl phosphite, tris(2,4-di-tert-butyl phenyl) phosphite, tris(nonylphenyl) phosphite, diphenyl phosphite (phosphonic acid, diphenyl ester), phenyl diisodecyl phosphite, tri-isooctyl phosphite, tri-isodecyl phosphite, dipropylene diphosphite, di-isooctyl phosphite, diisodecyl pentaerythritol diphosphite, tris(dipropylene glycol) phosphite, bis(2-ethylhexyl) phosphite, tris(2-ethylhexyl) phosphite, bis(tridecyl) hydrogen phosphite, phenyl neopentylene glycol phosphite, and the like. Thus, the phosphites are typically substituted with 0–3 phenyl groups which are optionally substituted with alkyl or glycol containing up to 12 carbon atoms, and the phosphites can be substituted with 0–3 alkyl or glycol groups containing up to 12 carbon atoms.

To make fibers, such as elastomeric polyurethane, polyols such as (but not limited to) those described herein can be reacted with 4,4'-diphenylmethane diisocyanate (MDI) or MDI isomers, for example, 2,4-diphenylmethane diisocyanate, or blends thereof, and then chain extended with short molecular weight glycols; or toluene diisocyanates (TDI) or TDI isomers, for example 2,4-TDI, or 2,6-TDI or blends thereof and then chain extended with short molecular weight amines. In like fashion, other di and polyfunctional isocyanates are also suitable for the above, such as but not limited to 4'4-diisocyanato-dicyclohexylmethane (hydrogenated MDI, H12MDI), 1,6 hexamethylene diisocyanate (HDI), 1-isocyanato-3-isocyanatomethyl-3,5,5-trimethyl-cyclohexane (isophorone diisocyanate, IPDI), and the like.

Other examples of chain extenders include ethylene diamine, diethylene triamine, 1,2-diaminopropane, 1,3-diaminopropane, 1,4-diaminobutane, and 3,3,5-trimethyl-5-aminomethyl cyclohexylamine; methylene bis aniline; substituted toluenediamines; and ethylene glycol, 1,2-dihydroxypropane, 1,6-dihydroxyhexane, and the polyols described herein.

Elastomers described hereinabove will have improved thermal and color retention properties.

C. Properties and Advantages

Foams produced by employing a polyester-derived or diacid-derived polyol as described herein, or a nonpolyol additive as described herein, which contain a dihydrazide linkage have been found to exhibit advantageous properties, include relative freedom from scorch. These advantages are shown in the following examples, which are provided for purposes of illustration and not limitations:

EXAMPLE 1

A polyester-based foam formulation shown in Table 1 was used to prepare cup mixed foam buns of the dimension 7.5"×9"×7". The buns were allowed to rest for 5 minutes after the completion of the rise. They were then heated in a preset microwave oven for 4 minutes and taken out. A thermometer inserted in the center of the foam recorded the temperature. Temperature rise was recorded for 8 minutes after the foam was taken out of the oven. The peak temperature was recorded to be between 160–165° C. The foams were sliced in the middle and the degree of scorch (browning) was measured by Hunter lab color quest calorimeter in accordance with ASTM method E-313. Table 2 summarizes the results obtained with the various additives.

TABLE 1

Polyester based foam formulation

| Ingredient | Parts by weight |
|---|---|
| Fomrez 76 ® | 100.00 |
| Water (D.I.) | 3.90 |
| Triethylene diamine catalyst | 0.39 |
| Fomrez ® M66-82 Surfactant | 1.30 |
| Dabco ® NCM catalyst | 1.00 |
| Dabco ® B16 catalyst | 0.60 |
| TDI 65/35 index | 112 |
| Anti scorch additive | As shown in Table 2 |

TABLE 2

The effect of various anti-scorch additives on the browning of polyester based polyurethane foam

| Anti-Scorch additive | ppm in the formula | relative whiteness Ref. white tile = 85.8 |
|---|---|---|
| No additive | 0.00 | 38 |
| Butylated hydroxy toluene | 2,000 | 47 |
| Butylated hydroxy toluene | 5,000 | 54 |
| Butylated hydroxy toluene | 7,000 | 52 |
| Phenothiazine | 4,000 | 19 |
| Butylated hydroxy toluene + Ba(ClO$_4$)$_2$ | 5,000 600 | 51 |
| Tri-phenyl phosphite | 10,000 | 50 |
| Isonox ® 32 | 5,000 | 46 |
| Naugard ® PS 350 | 5,000 | 42 |
| Irganox ® 1010 | 4,000 | 39 |
| Lowinox ® VB-063 | 5,000 | 41 |
| Vanox ® 1887 | 5,000 | 45 |
| Cyagard ® AO-711 | 5,000 | 51 |
| Santowhite ® | 5,000 | 46 |
| Anox ®-20 | 5,000 | 39 |
| Adipic dihydrazide (structure (1), i = j = 0) | 1,000 | 68 |

Clearly Table 2 shows that adipic dihydrazide is by far a more effective anti-scorch additive than conventional additives.

EXAMPLE 2

A polyether-based foam formulation of the following composition was tested for scorching using various additives:

| Ingredient | Parts by weight |
|---|---|
| KO 234 polyether polyol | 100.00 |
| Water | 5.60 |
| Dabco ® 33 1v catalyst | 0.10 |
| Niax ® A-1 catalyst | 0.10 |
| Niax ® L-540 silicone surfactant | 1.50 |
| TDI 80/20 isocyanate index | 120 |
| Anti scorch additive | As shown in Table 3 |
| Fomrez ® C-2 | 0.14 |

TABLE 3

The effect of various additives on scorching of polyether based polyurethane foam

| Additive | ppm | Core Temp. of foam | relative whiteness, white tile = 85.8 |
|---|---|---|---|
| none | 0.00 | 165 C. | 43.00 |
| Tetra hydroxyethyl-adipic dihydrazide | 6,000 | 165 C. | 60.00 |
| Tetra | 3,000 | | |

TABLE 3-continued

The effect of various additives on scorching of polyether based polyurethane foam

| Additive | ppm | Core Temp. of foam | relative whiteness, white tile = 85.8 |
|---|---|---|---|
| hydroxyethyl adipic dihydrazide + Trialkyl phosphite | 6,000 | 165 C. | 65.00 |

Table 3 clearly shows the effectiveness of hydroxy ethyl adipic dihydrazide in controlling scorch of polyether based polyurethane foam. In addition to its anti scorching activity this reactive tetra hydroxy alkyl hydrazide provides additional improvement in the firmness of the polyether based foam due to its crosslinking ability. Furthermore, the dihydrazide is non-fugitive and thus does not present a problem to air quality.

EXAMPLE 3

Preparation of novel polyester polyols containing hydrazide linkages in the backbone.

Reactants: 5100 g of Fomrez$^R$ 76, a poly diethylene glycoladipate branched with glycerin of hydroxyl number 58–60.5 and a molecular weight of approximately 2,800.

147.8 gs. of hydrazine 35% solution in water.

The polyester was weighed into an open stainless steel vessel and it was heated with nitrogen purge to 60° C. At this temperature the hydrazine solution was added to the polyester and the mixture was heated with stirring to about 150°C. Throughout the heating the purge with nitrogen gas was maintained and excess water was driven off. At the end of 2.5–3 hours of heating, a sample was analyzed for moisture. The % water was found to be 0.03%. At this stage the product was allowed to cool to room temperature. Titration of a sample of this product with 0.1N HCl revealed the absence of free base. IR analysis of the same sample indicated the formation of hydrazide linkages. The properties of this novel polyester were as follow:

| Viscosity at 25 C., cps: | 8,500 |
|---|---|
| Wt. % Moisture content: | 0.03 |
| Hydroxyl Number | 105–115 |
| Gardener Color | 2 |
| Acid Number | 1.4 |

The low acid number and the concomitant increase in the hydroxyl number are further proof of the reaction of hydrazine to form hydrazide linkages.

EXAMPLE 4

A blend consisting of Fomrez® 76 polyester and 1,000–10,000 ppm of the polyester-based hydrazide prepared in Example 3 were converted to polyurethane foam following the same procedure described in Example 1. The foams were aged in a microwave oven as described previously and then cut, and the degree of scorch(browning) was measured by colorimeter in accordance with ASTM E-313. The results are shown in Table 4:

TABLE 4

Degree of scorch of foam made with Fomrez 76 and the hydrazide of Example 3

| Amount of hydrazide from Example 3 | Colorimeter reading |
|---|---|
| none | 38 |
| 1,000 ppm | 68.6 |
| 2,000 ppm | 71.3 |
| 10,000 ppm | 77.0 |
| White tile (reference) | 85.8 |

Clearly the polyester of Example 3 had a powerful stabilizing effect against scorch in a polyurethane foam made from conventional polyester polyols.

EXAMPLE 5A and 5B

Polyols were made by reacting 1 mole of adipic dihydrazide with (A) 4 moles of ethylene oxide and (B) 2 moles of propylene oxide in an autoclave using water as the solvent. The reaction temperature was set between 100–150° C. and reaction time of 1–4 hrs. After the completion of the reaction the water was stripped on a rotary evaporator and the residual hydroxy ethylated adipic dihydrazides were analyzed by N.M.R. Table 5 shows the structure and corresponding N.M.R. analysis.

TABLE 5

N.M.R. Analysis of Alkoxyated Adipic Dihydrazide

| ChemShift, ppm. | Integral | Functional Group | No. of Protons |
|---|---|---|---|
| Structure A | | | |
| $(HOC_2H_4)_2N-HN-C(=O)(CH_2)_4-C(=O)-NH-N(C_2H_4OH)_2$ | | | |
| 1.0 | | | |
| 1.6 | 50 | $-C\underline{H}_2CH_2C(O)-$ | 4 |
| 2.25 | 48 | $-C\underline{H}_2C(O)-$ | 4 |
| 2.6 | | | |
| 2.9–3.0 | 100 | $-N-C\underline{H}_2$ | 8 |
| 3.6–3.7 | 101 | $-O-C\underline{H}_2-$ | 8 |
| Structure B | | | |
| $H_2N-NHC(=O)-(CH_2)_4C(=O)-NH-N(-C_3H_6OH)_2$ | | | |
| $HOC_3H_6-HN-HN-C(=O)-(CH_2)_4C(=O)-NH-NH-C_3H_6OH$ | | | |
| 1.00 | 172 | $-CH(-C\underline{H}_3)OH$ | 6 |
| 1.6 | 110 | $-C\underline{H}_2CH_2C(O)-$ | 4 |
| 2.2 | 113 | $-C\underline{H}_2C(O)-$ | 4 |
| 2.6 | 55 | $-N-C\underline{H}_2-$ | 2 |
| 2.8 | 52 | $-N-C\underline{H}_2$ | 2 |
| 3.7 | 62 | $-CH_2-C\underline{H}_2-O-$ | 2 |

Structure B
$H_2N-NHC(=O)-(CH_2)_4C(=O)-NH-N(-C_3H_6OH)_2$ $HOC_3H_6-HN-H\underline{N}-C(=O)-(CH_2)_4C(=O)-N\underline{H}-NH-C_3H_6OH$

| ChemShift ppm. | Integral | Functional Group | No. of Protons |
|---|---|---|---|
| 1.00 | 172 | $-CH(-C\underline{H}_3)OH$ | 6 |
| 1.6 | 110 | $-C\underline{H}_2CH_2C(O)-$ | 4 |
| 2.2 | 113 | $-C\underline{H}_2C(O)-$ | 4 |
| 2.6 | 55 | $-N-C\underline{H}_2-$ | 2 |
| 2.8 | 52 | $-N-C\underline{H}_2$ | 2 |
| 3.7 | 62 | $-CH_2-C\underline{H}_2-O-$ | 2 |

EXAMPLES 6A and 6B

Polyurethane foams were prepared in accordance with the procedure described in Example 1 except that the anti-scorch stabilizers were hydroxy alkylated adipic dihydrazide made as described in Examples 5A and 5B. The foam was heated in a microwave oven by the technique described in Example 1 and the relative browning was measured on a colorimeter in accordance with ASTM E-313. The results are shown in Table 6.

TABLE 6

Relative whiteness of foams stabilized with hydrazide of Examples 5A and 5B

| Hydrazide ppm | Relative whiteness colorimeter readings |
|---|---|
| 0.00 | 38 |
| 1,000 of Example 5A | 65.6 |
| 2,000 of Example 5A | 67.5 |
| 1,000 of Example 5B | 49 |

It is clear from Table 4 that the hydroxyethylated adipic dihydrazides are very effective scorch inhibitors and that they are superior to the hydroxy propylated dihydrazide.

EXAMPLE 7

A fire retarded foam formulation of the following composition was tested for scorching using anti-scorch additives of this invention:

| Amounts in parts by weight (except TDI index) | | | | | | | | | |
|---|---|---|---|---|---|---|---|---|---|
| FOMREZ ® 53 | 100 | | | | | | 100 | | |
| FOMREZ ® 53 (VANOX 1001) | | 100 | | | | | | | |
| FOMREZ ® 53 with alkyl phosphite | | | 100 | 100 | | | | | |
| FOMREZ ® 53 with hydrazide polyol | | | | | 100 | | | | |
| FOMREZ ® 53 with hydrazide modified polyol | | | | | | 100 | 100 | | |
| FOMREZ ® 53 with alkyl phosphite | | | | | | | | | 100 |
| FYROL ® FR2 | 20 | 20 | 20 | 20 | 20 | 20 | 20 | 20 | 20 |
| DI WATER | 4.44 | 4.44 | 4.44 | 4.44 | 4.44 | 4.44 | 4.44 | 4.44 | 4.44 |
| NIAX ® A-31 | .72 | .72 | .72 | .72 | .72 | .72 | .72 | .72 | .72 |
| FOMREZ ® M66-82 | 1.11 | 1.11 | 1.11 | 1.11 | 1.11 | 1.11 | 1.11 | 1.11 | 1.11 |
| NIAX ® L-532 | .33 | .33 | .33 | .33 | .33 | .33 | .33 | .33 | .33 |
| FOMREZ ® c-2 | .15 | .15 | .15 | .15 | .15 | .15 | .15 | .15 | .15 |
| 80/20 TDI INDEX | 96 | 96 | 96 | 96 | 96 | 96 | 96 | 96 | 96 |

This example also illustrate the synergism of trialkyl phosphite and hydrazines. The relative whiteness of the various foams made with different stabilizers is shown in Table 7.

TABLE 7

Scorch Evaluation in Fire Retarded Polyurethane Foam Formulation

| Additive | Relative Whiteness of Core of the Foam |
|---|---|
| Trialkyl phosphite | −34 |
| BHT | −30 |
| Vanox ® V-1001 and trialkyl phosphite | 2–3 |
| Vanox ® V-1001 and BHT | 2–3 |
| Hydyrazided polyol and trialkyl phosphite | 35 |

EXAMPLE 8

This example illustrates the excellent scorch and physical properties of machine poured foam. The formulations used and the physical properties of the resulting foams are shown in Table 8 while the good scorch resistances are shown in Table 9.

TABLE 8

Formulations and physical properties for scorch improved foams

| | | | | | |
|---|---|---|---|---|---|
| Stabilized Polyol | 100 | 100 | 100 | | |
| FOMREZ ® 76 | | | | 100 | 100 |
| DI WATER | 3.9 | 3.9 | 3.9 | 3.9 | 3.9 |
| DABCO ® LV-33 | .39 | .39 | .39 | .39 | .39 |
| FOMREZ ® M66-82 | 1.3 | 1.3 | 1.3 | 1.3 | 1.3 |
| DABCO ® NCM | 1.0 | 1.0 | 1.0 | 1.0 | 1.0 |
| DABCO ® B-16 | .60 | .60 | .60 | .60 | .60 |
| Alkyl phosphite | | .60 | .60 | .60 | |

TABLE 8-continued

Formulations and physical properties for scorch improved foams

| | | | | | |
|---|---|---|---|---|---|
| 65/35 TDI INDEX | 112 | 112 | 112 | 112 | 112 |
| FOAM REACTIVITY | | | | | |
| CREAM TIME, sec. | 5 | 6 | 6 | 6 | 6 |
| RISE TIME, sec. | 42 | 39 | 40 | 40 | 40 |
| | 1P1416 | 2P1416 | 3P1416 | 4P1416 | 5P1416 |
| FOAM PROPERTIES | | | | | |
| DENSITY, pcf | 1.79 | 1.795 | 1.89 | 1.96 | 1.855 |
| IFD, lbs./50 sq. in. | | | | | |
| 15" × 15" × 4" | | | | | |
| ASTM D 3574-81 | | | | | |
| 25% | 75 | 74 | 78.5 | 79 | 67.25 |
| 50% | 97 | 95.5 | 101 | 103 | 89.5 |
| 65% | 127 | 126.5 | 132 | 137 | 117 |
| TENSILE, psi | 18.34 | 15.57 | 18.98 | 19.38 | 20.83 |
| ELONGATION, % | 108 | 90 | 92 | 82 | 86 |
| TEAR, pli | 1.71 | 1.57 | 1.44 | 1.74 | 1.77 |
| 22 HRS. DRY | | | | | |
| HEAT AGE | | | | | |
| AT 140° C. | | | | | |
| TENSILE, psi | 24.2 | 21.9 | 25.4 | 24.9 | 27.2 |
| ELONGATION, % | 187 | 183 | 180 | 188 | 212 |
| 24 HRS. | | | | | |
| AUTOCLAVE AT | | | | | |
| 5 PSI | | | | | |
| TENSILE, psi | 17.37 | 14.33 | 16.03 | 17.2 | 18.54 |
| ELONGATION, % | 303 | 237 | 237 | 228 | 320 |
| AIR FLOW, cfm | 0.989 | 0.7995 | 0.811 | 0.711 | 1.996 |
| CELL COUNT, cli | 50 | 50 | 50 | 50 | 50 |
| CLICKABILITY | EX | EX | EX | EX | EX |

TABLE 9

Scorch properties of machine poured foam of formulation in Table 8

| Stabilizer | Relative whiteness of core of the foam |
|---|---|
| BHT | 25 |
| Hydrazided polyol | 40 |
| Hydrazided polyol + alkyl phosphite | 50 |

What is claimed is:

1. A process for producing polyurethane foam, comprising reacting a reaction mixture comprising a polyisocyanate component, a polyol component, and water, wherein at least a portion of the polyol component comprises a polyol having a molecular weight of 250 to 33,000, and containing ester linkages —C(=O)O— and hydrazide linkages —C(=O)—NHNH—C(=O)—.

2. A process for producing polyurethane foam, comprising reacting a reaction mixture comprising a polyisocyanate component, a polyol component, water, and a compound selected from the group consisting of compounds of structures (1), (2) and (3):

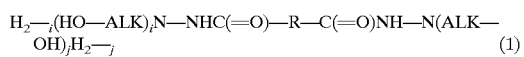

(1)

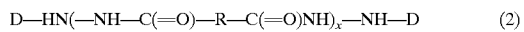

(2)

(3)

wherein each ALK is independently $C_2H_4$, $C_3H_6$ or $C_4H_8$, R is straight or branched divalent alkyl containing 2 to 36 carbon atoms; cycloalkyl, cycloalkyl-alkyl, or alkyl-cycloalkyl containing 5 to 18 carbon atoms; or aryl, aryl-alkyl, or alkyl-aryl-alkyl containing 6 to 18 carbon atoms;

x is 0 or 1;

i is 0–2 and j is 0–2; wherein the sum of (i+j) is at least 1;

D is $R^1$—C(=O)— wherein $R^1$ is $C_1$ to $C_{36}$ alkyl, $C_5$ to $C_{18}$ cycloalkyl, cycloalkyl-alkyl, or alkylcycloalkyl-alkyl, $C_6$–$C_{18}$ aryl, aryl-alkyl, or alkyl-arylalkyl, hydroxy —$C_1$-$C_{12}$ alkyl, or hydroxyethoxyethyl; or (Ph)—R—C(=O)— wherein Ph denotes phenyl which is substituted with hydroxyl and with one or two $C_1$-$C_{18}$ alkyl groups; and when x is 1, D can be any of the foregoing or H; —CH$_3$; or phenyl which is optionally substituted with one, two or three alkyl groups containing 1 to 12 carbon atoms;

 (3)

wherein T is oxygen and A is —R—Ph wherein R and Ph are as defined above; or T is oxygen or sulfur and A is

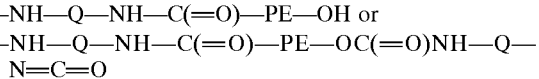

wherein Q is an aliphatic hydrocarbon group containing from 4 to 12 carbon atoms, a cycloaliphatic hydrocarbon group containing from 6 to 15 carbon atoms, an aromatic hydrocarbon group containing from 6 to 15 carbon atoms, or an araliphatic hydrocarbon group containing from 7 to 15 carbon atoms, provided that Q can contain as well a —C(=O)— group; and PE is an alkoxy or polyalkoxy group or a hydrocarbon containing at least one —C(=O) O— group.

3. A process for producing polyurethane foam, comprising reacting a reaction mixture comprising a polyisocyanate component, a polyol component, water, and a compound according to structure (1) of claim 2, wherein the sum of (i+j) is greater than 1.

4. A process for producing polyurethane foam, comprising reacting a reaction mixture comprising a polyisocyanate component, a polyol component, water, and a compound according to structure (2) of claim 2.

5. A process for producing polyurethane foam comprising reacting a reaction mixture comprising a polyisocyanate component, a polyol component, water, and a compound according to structure (3) of claim 2, wherein each occurrence of T is O.

6. A process for producing polyurethane foam, comprising reacting a reaction mixture comprising a polyisocyanate component, a polyol component, water, and a compound according to structure (3) of claim 2, wherein each occurrence of T is S.

7. The process according to claim 1, wherein the reaction mixture further comprises 500 to 10,000 ppm of at least one phosphite.

8. The process according to claim 2, wherein the reaction mixture further comprises 500 to 10,000 ppm of at least one phosphite.

9. The process according to claim 3, wherein the reaction mixture further comprises 500 to 10,000 ppm of at least one phosphite.

10. The process according to claim 4, wherein the reaction mixture further comprises 500 to 10,000 ppm of at least one phosphite.

11. The process according to claim 5, wherein the reaction mixture further comprises 500 to 10,000 ppm of at least one phosphite.

12. The process according to claim 6, wherein the reaction mixture further comprises 500 to 10,000 ppm of at least one phosphite.

13. Polyurethane foam produced by the process of claim 1.

14. Polyurethane foam produced by the process of claim 2.

15. Polyurethane foam produced by the process of claim 2, wherein the reaction mixture further comprises 500 to 10,000 ppm of at least one phosphite.

16. Polyurethane foam produced by the process of claim 3.

17. Polyurethane foam produced by the process of claim 3 wherein said reaction mixture further comprises 500 to 10,000 ppm of at least one phosphite.

18. Polyurethane foam produced by the process of claim 4.

19. Polyurethane foam produced by the process of claim 4 wherein said reaction mixture further comprises 500 to 10,000 ppm of at least one phosphite.

20. Polyurethane foam produced by the process of claim 5.

21. Polyurethane foam produced by the process of claim 5 wherein said reaction mixture further comprises 500 to 10,000 ppm of at least one phosphite.

22. Polyurethane foam produced by the process of claim 6.

23. Polyurethane foam produced by the process of claim 6 wherein said reaction mixture further comprises 500 to 10,000 ppm of at least one phosphite.

* * * * *